(12) United States Patent
Morita et al.

(10) Patent No.: US 12,203,512 B2
(45) Date of Patent: *Jan. 21, 2025

(54) CAM CLUTCH UNIT

(71) Applicant: TSUBAKIMOTO CHAIN CO., Osaka (JP)

(72) Inventors: Akira Morita, Osaka (JP); Riku Kato, Osaka (JP); Hirokazu Tsuneda, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,548

(22) Filed: Nov. 2, 2023

(65) Prior Publication Data

US 2024/0200618 A1 Jun. 20, 2024

(30) Foreign Application Priority Data

Dec. 15, 2022 (JP) ................... 2022-200648

(51) Int. Cl.
*F16D 41/07* (2006.01)
*F16C 41/00* (2006.01)
*F16D 41/063* (2006.01)
*F16D 41/067* (2006.01)

(52) U.S. Cl.
CPC ............ *F16D 41/07* (2013.01); *F16C 41/001* (2013.01); *F16D 41/063* (2013.01); *F16D 41/067* (2013.01)

(58) Field of Classification Search
CPC ...... F16D 41/07; F16D 41/063; F16D 41/067; F16C 41/001; F16C 33/467; F16C 33/4676; F16C 43/08; F16C 43/083
See application file for complete search history.

(56) References Cited

U.S. PATENT DOCUMENTS 4,222,620 A * 9/1980 Mirring ............... F16C 33/4676
384/576
5,664,653 A 9/1997 Kurita et al.
5,676,226 A * 10/1997 Lampela ................. F16D 41/07
192/113.32

(Continued)

FOREIGN PATENT DOCUMENTS

JP 2005-106135 A 4/2005

OTHER PUBLICATIONS

Notice of Allowance dated May 15, 2023, issued in U.S. Appl. No. 18/093,834 (13 pages).

*Primary Examiner* — Richard M Lorence
(74) *Attorney, Agent, or Firm* — WHDA, LLP

(57) ABSTRACT

A cam clutch unit includes a plurality of cams and a plurality of rollers disposed so as to be aligned in a circumferential direction between an inner ring and an outer ring, a cage ring having a plurality of pocket portions which regulate relative movement in a circumferential direction of the cam and the roller, and an annular spring which urges the cam, in which the cam has an engagement stepped portion capable of engagement with the spring, the cage ring has an end-part circumferential annular portion continuing in the circumferential direction on an end surface in the axial direction, the pocket portion regulates movement of the roller to the outer ring side and the inner ring side and has a claw portion capable of insertion of the roller from the outer ring side or the inner ring side by elastic deformation.

4 Claims, 10 Drawing Sheets

(56) References Cited

U.S. PATENT DOCUMENTS

| | | | |
|---|---|---|---|
| 6,640,949 B1 | 11/2003 | Vranish | |
| 9,739,320 B2 | 8/2017 | Ishitani et al. | |
| 10,422,392 B2 | 9/2019 | Shibata et al. | |
| 11,767,891 B2 * | 9/2023 | Fukuda | F16D 41/067 |
| | | | 192/45.006 |
| 2005/0067248 A1 | 3/2005 | Takasu | |
| 2015/0147016 A1 * | 5/2015 | Yasuda | F16C 33/585 |
| | | | 384/577 |
| 2023/0341011 A1 * | 10/2023 | Brzus | F16C 19/26 |

\* cited by examiner

RELATED ART

RELATED ART

RELATED ART

RELATED ART

RELATED ART

CAM CLUTCH UNIT

BACKGROUND OF THE INVENTION

1. Field of the Invention

The present invention relates to a cam clutch unit which transmits and shuts off a torque between an input shaft and an output shaft.

2. Description of the Related Art

A cam clutch unit including a plurality of cams and a plurality of rollers disposed between an inner ring and an outer ring coaxially provided capable of relative rotation, a cage ring having a plurality of pocket portions which regulate relative movement in a circumferential direction of the cam and the roller, and an annular spring which urges the cam is publicly known as a cam clutch unit.

Regarding a cam clutch unit 500 including a cam and a roller, as shown in FIGS. 8 to 12, for example, a cam 530 and a roller 540 are accommodated in a pocket portion 551 of a cage ring 550 so that a plurality of the cams 530 and a plurality of the rollers 540 are disposed in a circumferential direction between an inner ring and an outer ring coaxially provided capable of relative rotation, and relative movement in the circumferential direction of the cam 530 and the roller 540 is regulated.

Moreover, the cam 530 and the roller 540 have groove portions 535, 545 in the circumferential direction, respectively, and are configured such that annular springs 560 are accommodated in the groove portions 535, 545 and urge the cam 530 and the roller 540 toward the inner ring side.

In the publicly-known cam clutch unit, since at the centers of the cam 530 and the roller 540 requiring a material which is resistant against abrasion or impact have the groove portions 535, 545 in the circumferential direction in which the annular springs 560 are accommodated, there were such problems that the number of machining processes at manufacture of the cam 530 and the roller 540 is large, a degree of difficulty is high, and a width dimension is limited in machining, whereby the width cannot be made smaller.

Moreover, the roller 540 needs to be freely rotated by being restricted only in an axial direction, but since frictional sliding is generated between a bottom part of the groove portion 545 and a spring 560, there was a problem that unignorable rotational resistance is generated at the time of high-speed rotation, and there was a concern that deterioration of the spring 560 due to abrasion would affect a life of the cam clutch itself.

For example, as shown in the Japanese Patent Application Publication No. 2005-106135, the one with an urging portion by a spring provided on both end sides in the axial direction of the cam and the roller is also publicly known, but the cam needs a locking structure in order to prevent removal in the axial direction of the spring, and though the degree of difficulty in the machining of the cam and the roller is somewhat alleviated, the number of machining processes cannot be reduced.

In order to solve the aforementioned problems, as shown in FIGS. 13 to 17, the applicant proposed a cam clutch unit 600 including a plurality of cams 630 as engagement elements which transmit and shut off a torque between an inner ring and an outer ring in an annular space between a track surface of the inner ring and a track surface of the outer ring coaxially provided capable of relative rotation, a plurality of rollers 640 which freely rotate the inner ring and the outer ring, a cage ring 650 having a plurality of pocket portions 651, 652 which regulate relative movement in the circumferential direction of the cam 630 and the roller 640, and an annular spring 660 which urges each of the plurality of cams 630 in a meshing direction with respect to the inner ring and the outer ring (Japanese Patent Application No. 2022-5605).

In this cam clutch unit 600, each of the plurality of cams 630 has, as shown in FIG. 15 and the like, an engagement stepped portion 631, which is engageable with the annular spring 660, on one of end surfaces in the axial direction.

The engagement stepped portion 631 has an inclined shape with a right side in the illustration positioned on an outer periphery side in a state where the cam 630 is free, and by means of pressing by the spring 660 onto the right side of the engagement stepped portion 631, the cam 630 is urged to the inner ring side and is urged to swing in a direction in which the cam 630 is operated.

As shown in FIG. 16 and the like, the plurality of rollers 640 do not have a groove or a stepped part, and an axial-direction dimension rw of the roller 640 is equal to or smaller than an axial-direction dimension cw excluding the engagement stepped portion 631 of the cam 630.

Outer-peripheral edge parts of both end surfaces of the roller 640 is chamfered so as to prevent hooking with the spring 660.

The cage ring 650 has the pocket portion 651 which accommodates the cam 630 and regulates relative movement in the circumferential direction as well as the pocket portion 652 which accommodates the roller 640 and regulates the relative movement in the circumferential direction and a plurality of hook portions 653 which regulate movement in the axial direction of the annular spring 660.

The pocket portion 651 which accommodates the cam 630 and the pocket portion 652 which accommodates the roller 640 of the cage ring 650 are disposed alternately in the circumferential direction.

In each of the pocket portions 651, 652, movement in one side of the axial direction of the cam 630 and the roller 640 is regulated on a surface on one end surface side in the axial direction, and the movement in the other side in the axial direction is regulated by the spring 660.

Moreover, a surface adjacent to the roller 640 of the pocket portion 652 which accommodates the roller 640 is formed having a shape which regulates the movement of the roller 640 to the outer ring side and the inner ring side.

Furthermore, as shown in FIG. 17, the hook portion 653 adjacent to a left side in the illustration of the pocket portion 651 which accommodates the cam 630 has a hook bottom portion 654 which regulates movement in a radial direction of the annular spring 660.

SUMMARY OF THE INVENTION

The aforementioned cam clutch unit proposed by the applicant has such superior effects that a simple structure, fewer machining processes at manufacture, a lower degree of difficulty, whereby the width can be made thinner, and the engagement stepped portion on the end surface of the cam does not have to be machined to such a shape that regulates movement in the axial direction of the spring, and moreover, the number of machining processes is decreased, and the degree of difficulty is lowered.

Moreover, there were such superior effects that a radius of the spring on both ends of the each cam is specified by the hook bottom portion, whereby an influence on a pressing force of each cam by a change in an attitude of the other cams is suppressed and thus, the adjacent cams can be uniformly pressurized, and a cam clutch with high accuracy can be provided and moreover, the roller can freely rotate by being restricted only in the axial direction, and frictional sliding is rarely generated between it and the spring, whereby the rotational resistance can be reduced.

However, when this cam clutch unit is to be assembled, the spring is extended around after the roller is inserted into the pocket in the axial direction so as to regulate the movement from the axial direction, but since the roller is inserted into the pocket from the axial direction, a circumferential annular portion continuing in the circumferential direction cannot be provided on the hook portion side, and rigidity of the cage ring has difficulty in the cam clutch unit which is long in the axial direction, which was a problem.

The present invention has an object to solve the problems as above and has an object to provide such a cam clutch unit that the number of machining processes at the manufacture of the cam clutch is small, a degree of difficulty is lower, the rotational resistance by the roller can be reduced, and rigidity of the cage ring can be improved.

The present invention is a cam clutch unit including a plurality of cams and a plurality of rollers disposed between an inner ring an outer ring coaxially provided capable of relative rotation, a cage ring having a plurality of pocket portions which regulate relative movement in a circumferential direction of the cam and the roller, and an annular spring which urges the cam, in which the cam has an engagement stepped portion which is engageable with the spring, the cage ring has an end-part circumferential annular portion continuing in the circumferential direction on an end surface in the axial direction, a pocket portion of the cage ring is configured to have such a shape that regulates movement of a surface adjacent to the roller in the circumferential direction to an outer ring side and an inner ring side of the roller and to have a claw portion capable of insertion of the roller from the outer ring side or the inner ring side by elastic deformation.

According to a cam clutch unit according to one aspect of the present application, since the cage ring has the end-part circumferential annular portion continuing in the circumferential direction on the end surface in the axial direction, the rigidity of the cage ring can be improved, and since the pocket portion of the cage ring has the claw portion capable of insertion of the roller from the outer ring side or the inner ring side by elastic deformation, the insertion of the roller at the assembling is facilitated, the structure is simple, the number of machining processes at the manufacture is smaller, the degree of difficulty is lower, and the thinning of the width is enabled.

According to another aspect, since the cage ring has a plurality of hook portions which regulate movement of the annular spring in the axial direction, the engagement stepped portion on the one of end surfaces of the cam and the roller does not have to be machined into a shape which regulates the movement in the axial direction of the spring and moreover, the number of machining processes is smaller, and the degree of difficulty is lower, and since the hook portion has a hook bottom portion which regulates the movement in a radial direction of the annular spring, a radius of the spring on both ends of each of the coms is specified, and an influence by a change in an attitude of the other cams by a pressing force of each of the cams is suppressed, the adjacent cams can be uniformly pressurized, and a cam clutch with high accuracy can be provided.

According to another aspect, since a claw portion has chamfering, which facilitates the insertion, on the end part on the insertion side of the roller, the insertion of the roller at the assembling is further facilitated.

According to another aspect, since the pocket portion accommodating the roller has an abutting portion which regulates the movement in the axial direction of the roller to the spring side, contact between the roller and the spring can be completely eliminated, the rotational resistance can be further reduced, and durability of the spring is improved.

According to another aspect, since a plurality of claw portions are provided with a length shorter than an axial length of the roller in the axial direction, the insertion of the roller at the assembling is further facilitated.

DESCRIPTION OF THE PREFERRED EMBODIMENTS

Figure 1:
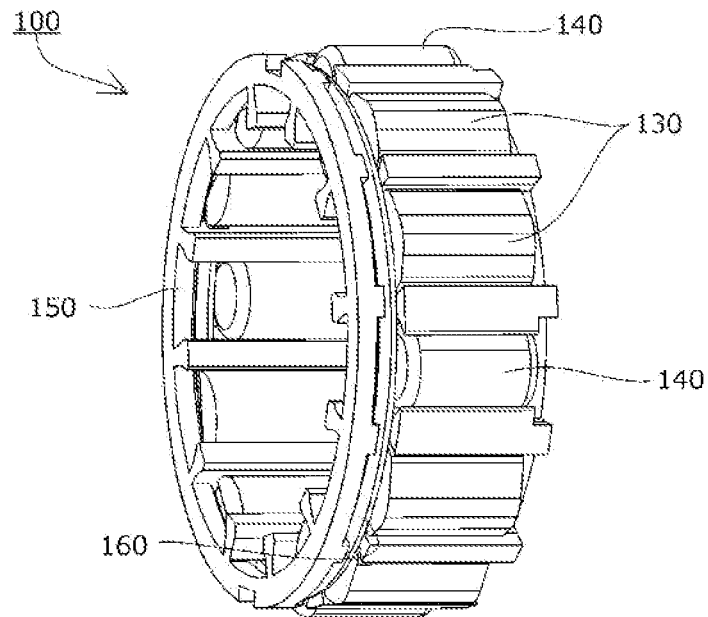
FIG. 1 is a perspective view of a cam clutch unit of an Embodiment of the present invention.

A cam clutch unit 100 according to an Embodiment of the present invention includes, as shown in FIGS. 1 to 6, a plurality of cams 130 as engagement elements which transmit and shut off a torque between an inner ring and an outer ring in an annular space between a track surface of the inner ring and a track surface of the outer ring coaxially provided capable of relative rotation, a plurality of rollers 140 which freely rotate the inner ring and the outer ring, a cage ring 150 having a plurality of pocket portions 151, 152 which regulate relative movement in a circumferential direction of the cam 130 and the roller 140, and an annular spring 160 which urges each of the plurality of cams 130 to a meshing direction with respect to the inner ring and the outer ring.

Figure 2:
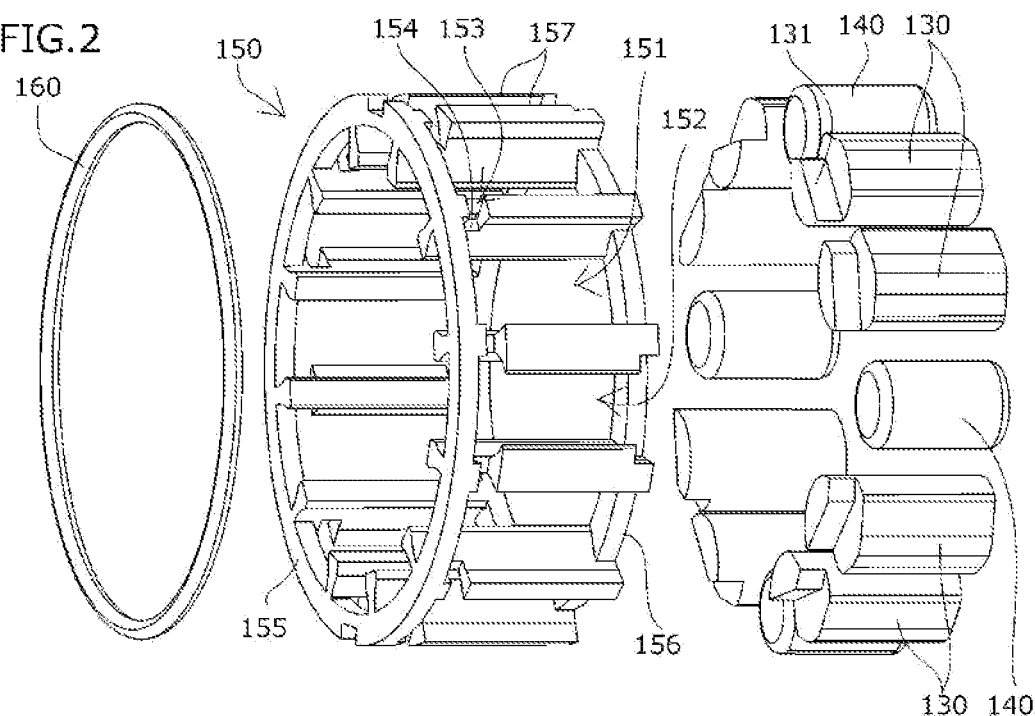
FIG. 2 is an exploded perspective view of the cam clutch unit shown in FIG. 1.
Figure 3:
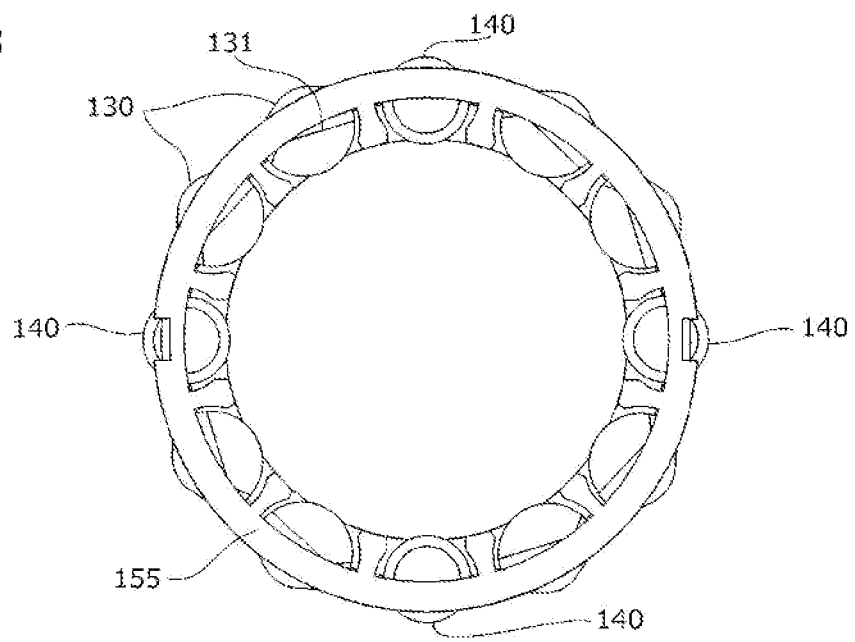
FIG. 3 is a side view of the cam clutch unit shown in FIG. 1 on a spring side.
Figure 4:
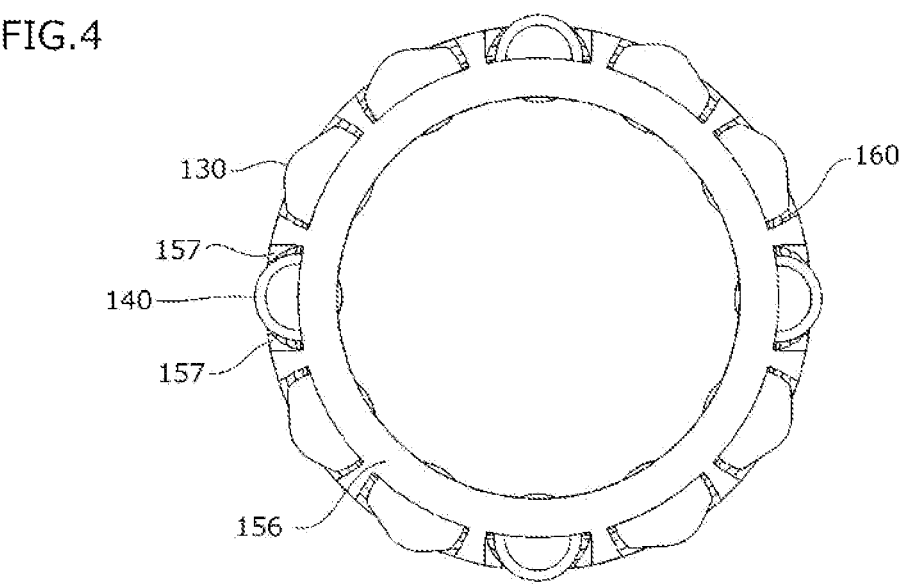
FIG. 4 is a side view of the cam clutch unit shown in FIG. 1 on a side opposite to FIG. 3.
Figure 5:
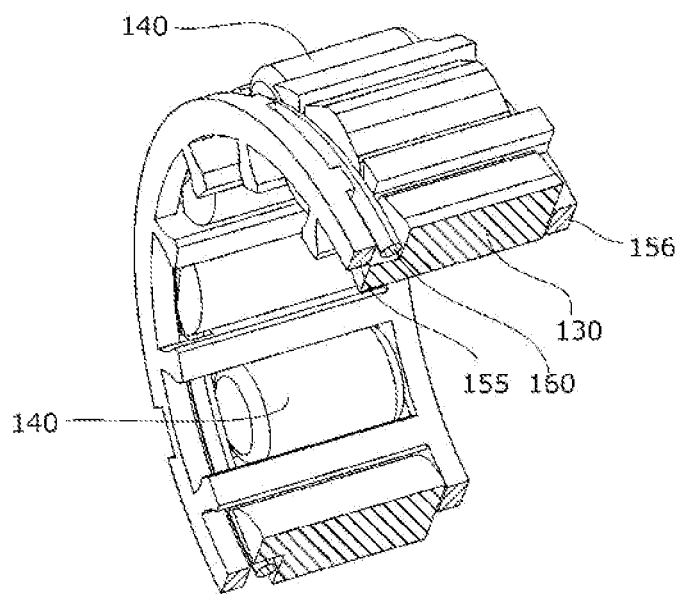
FIG. 5 is a partially sectional perspective view of the cam clutch unit shown in FIG. 1.

Each of the plurality of cams 130 has, as shown in FIG. 2 and the like, an engagement stepped portion 131, which is engageable with the annular spring 160, on one of end surfaces in an axial direction.

In this Embodiment, the engagement stepped portion 131 has an inclined shape which is a protruding part at an eccentric position, and when the spring 160 presses the protruding part of the engagement stepped portion 131, the cam 130 is urged toward the inner ring side and is urged to swing in a direction in which the cam 130 is operated.

The plurality of rollers 140 do not have a groove or a stepped part as shown in FIG. 2 and the like, and in this Embodiment, an axial dimension of the roller 140 is equal to or smaller than an axial dimension of the cam 130 excluding the engagement stepped portion 131.

In this Embodiment, outer-peripheral edge parts on both end surfaces of the roller 140 are chamfered, which smoothens insertion of the cam clutch unit with respect to the inner/outer ring.

The cage ring 150 has the pocket portion 151 which accommodates the cam 130 and regulates relative movement in the circumferential direction as well as the pocket portion 152 which accommodates the roller 140 and regulates relative movement in the circumferential direction and a plurality of hook portions 153 which regulate movement in the axial direction of the annular spring 160.

The cage ring 150 has an end-part circumferential annular portion 155 continuing in the circumferential direction on an end surface on the hook portion 153 side in the axial direction and an end-part circumferential annular portion 156 continuing in the circumferential direction on the end surface on a side opposite thereto (rear surface side) and is constituted so that rigidity of the entire cage ring 150 is improved by a member in the axial direction forming each of the pocket portions 152 being supported on both sides.

In this Embodiment, the pocket portions 151 of the cage ring 150, which accommodate the cams 130, are uniformly disposed at 8 spots and the pocket portions 152 which accommodate the rollers 140 at four spots.

Moreover, a surface on the cam side of the end-part circumferential annular portion 155 constitutes an end surface on outer sides of the plurality of hook portions 153 and a surface on the cam side of the end-part circumferential annular portion 156 constitutes a contact surface in the axial direction of the cam 130, the roller 140 in each of the pocket portions 151, 152.

In each of the pocket portions 151, 152, the cam 130 and the roller 140 have the movement regulated by the spring 160 on the one of end surface sides in the axial direction and the movement to the other side in the axial direction is regulated by the end-part circumferential annular portion 156 on the rear surface side.

Moreover, the surface adjacent to the roller 140 of the pocket portion 152 which accommodates the roller 140 is formed having a shape which regulates movement of the roller 140 to the outer ring side and the inner rig side.

Furthermore, on the surface adjacent to the roller 140 of the pocket portion 152 accommodating the roller 140, a claw portion 157 capable of insertion the roller 140 from the outer ring side by elastic deformation is provided.

Figure 6:
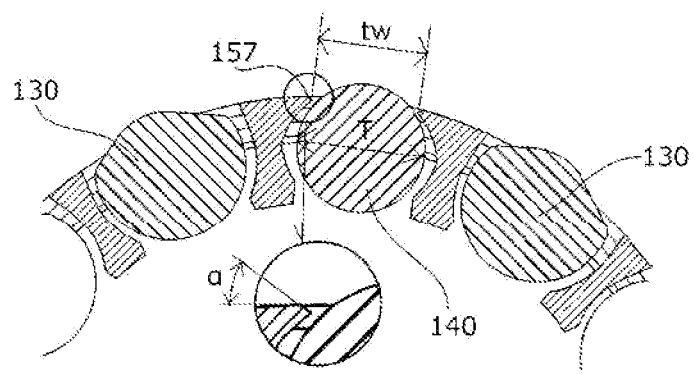
FIG. 6 is a partially sectional view of the cam clutch unit shown in FIG. 1.

In this Embodiment, as shown in FIG. 6, the claw portion 157 is chamfered on the end part on the insertion side in order to facilitate the insertion of the roller 140, and by setting an interval tw=3.7 mm at distal ends of the opposing claw portions 157 with respect to a diameter T=4.145 mm of the roller 140, and an angle α=30° with respect to a tangent by the chamfering in a straight-line sectional state, facilitation of the insertion and maintaining after the insertion are both realized.

Moreover, as shown in FIG. 2, the cage ring 150 has the hook portion 153 which regulates the movement of the annular spring 160 in the axial direction, and the hook portion 153 has a hook bottom portion 154 which regulates the movement of the annular spring 160 in the radial direction.

As a result, the roller 140 does not restrict tension of the spring 160 at all, and the spring 160 presses the protruding part at an eccentric position of the engagement stepped portion 131 of the cam 130 and thus, each of the cams 130 is independently pressed in the vicinity of the center of the spring 160 extended between the two hook bottom portions 154, whereby a uniform and highly accurate operation can be performed without being influenced by the change in the attitude of the other cams 130.

It is to be noted that, in this Embodiment, the eight cams 130 and the four rollers 140 are in the same numbers and are alternately disposed, but the number and the disposition of each of the cams 130 and the rollers 140 and may be arbitrary.

Moreover, the shape of the cam 130 may be arbitrary and may be a sprag shape, for example.

Moreover, a height in the radial direction of each of the hook bottom portions 154 may be uniform or may be different depending on a position in the circumferential direction.

By setting the height of the hook bottom portion 154 depending on the number, disposition of each of the cams 130 and the rollers 140 as appropriate, similarly to the aforementioned Embodiment, each of the cams 130 can perform the uniform and highly accurate operation.

Figure 7:
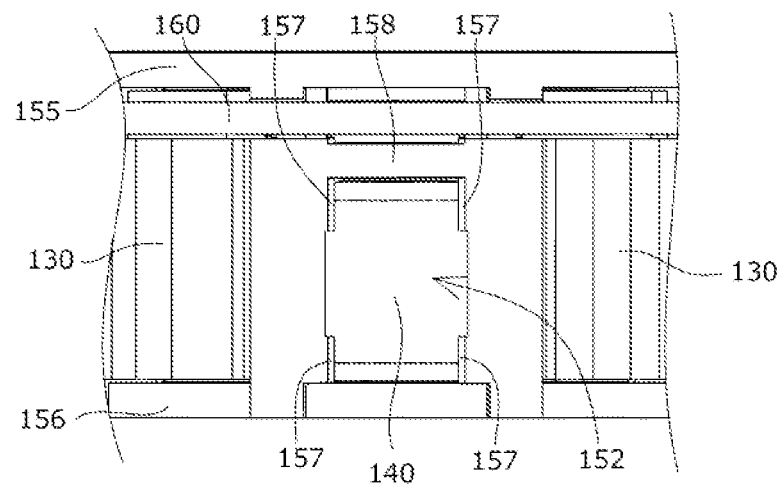
FIG. 7 is a partially plan view of a cage ring of a cam clutch unit according to another Embodiment of the present invention.
Figure 8:
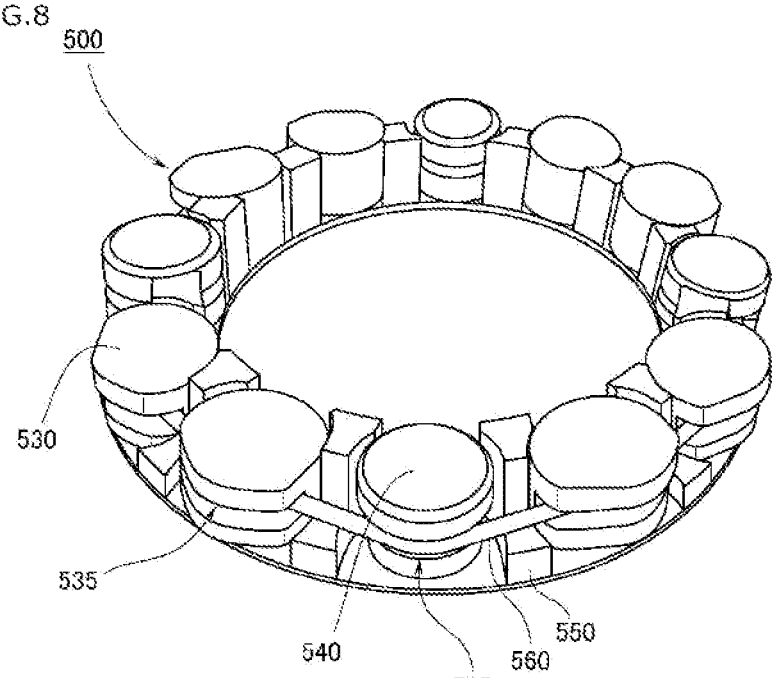
FIG. 8 is a perspective view of a conventional cam clutch unit.
Figure 9:
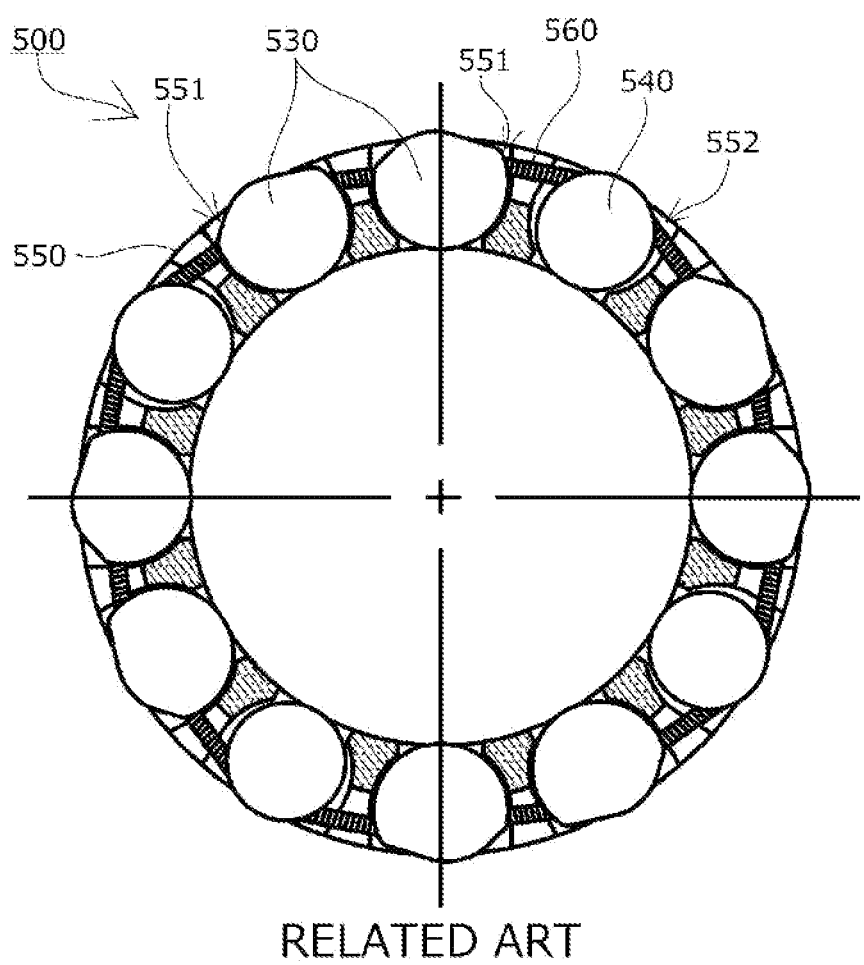
FIG. 9 is a side view of the cam clutch unit shown in FIG. 8 viewed in a rotation axis direction.
Figure 10:
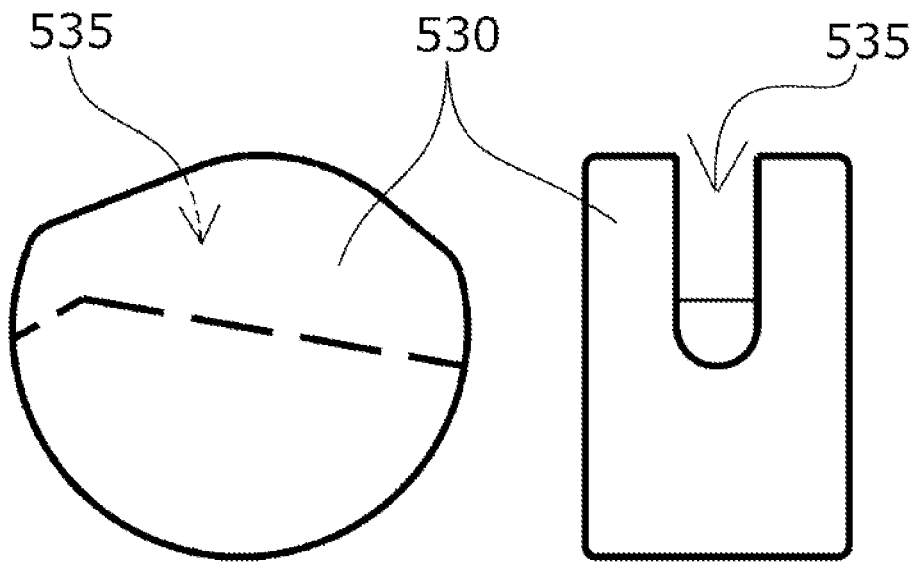
FIG. 10 is a side view and a front view of a cam of the cam clutch unit shown in FIG. 8.
Figure 11:
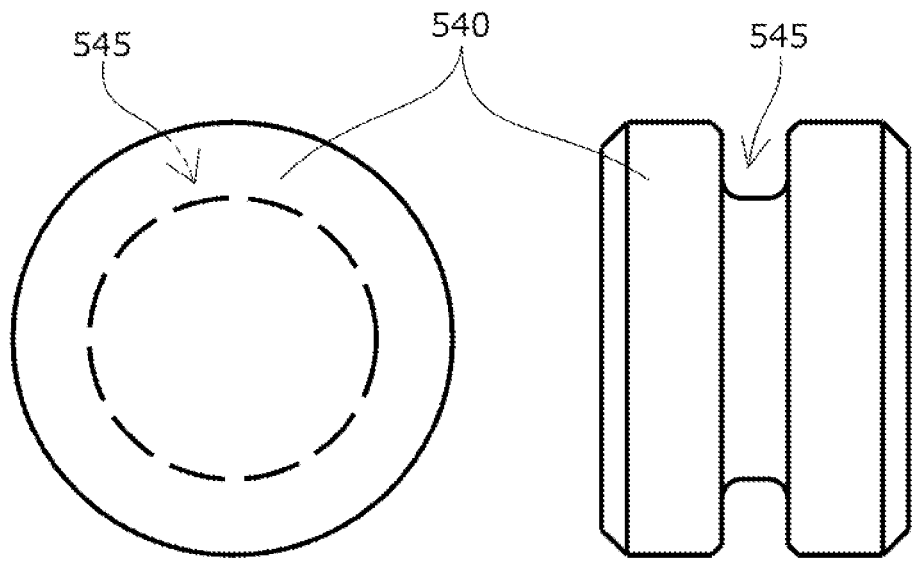
FIG. 11 is a side view and a front view of a roller of the cam clutch unit shown in FIG. 8.
Figure 12:
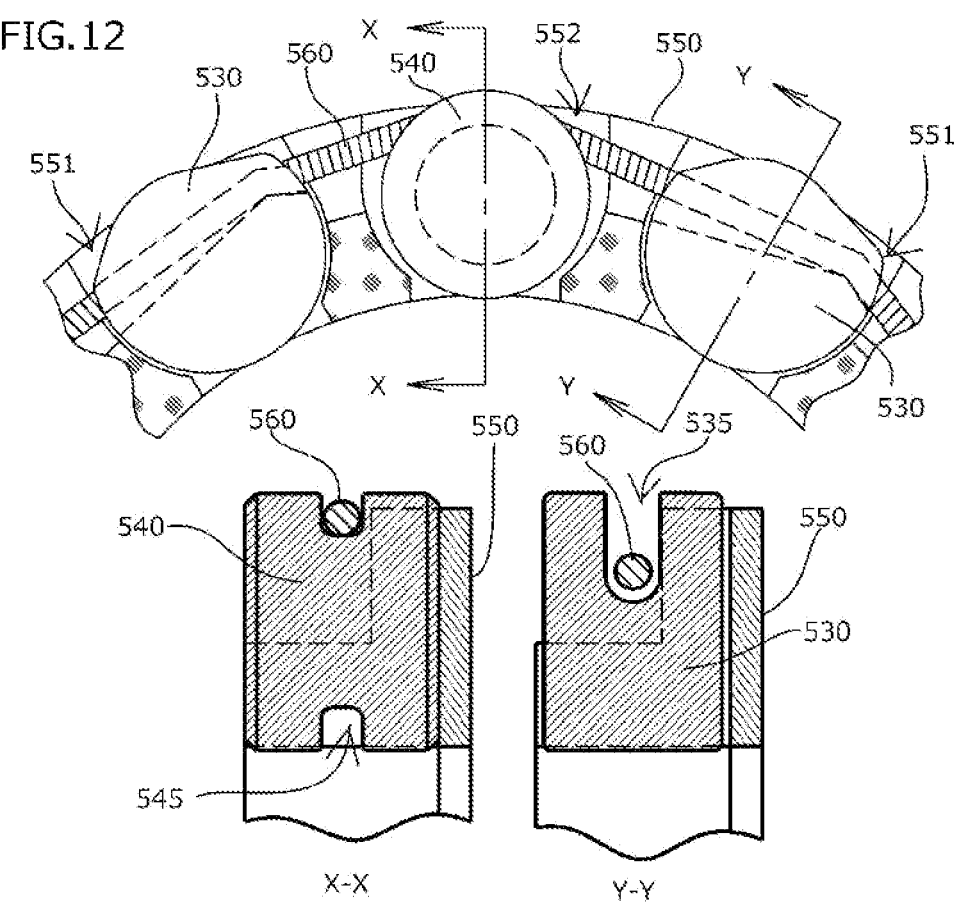
FIG. 12 is a partial side view and a sectional view of the cam clutch unit shown in FIG. 8.
Figure 13:
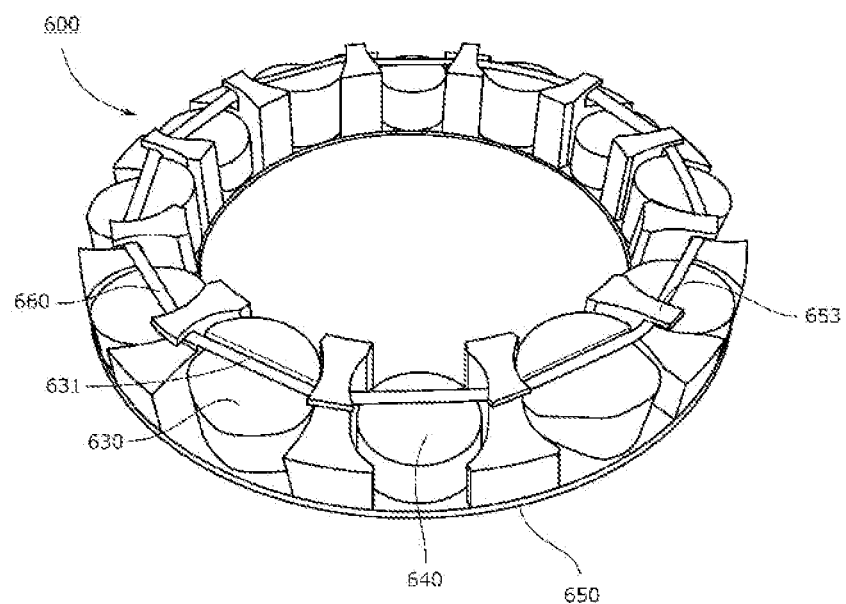
FIG. 13 is a perspective view of a cam clutch unit according to a reference example.
Figure 14:
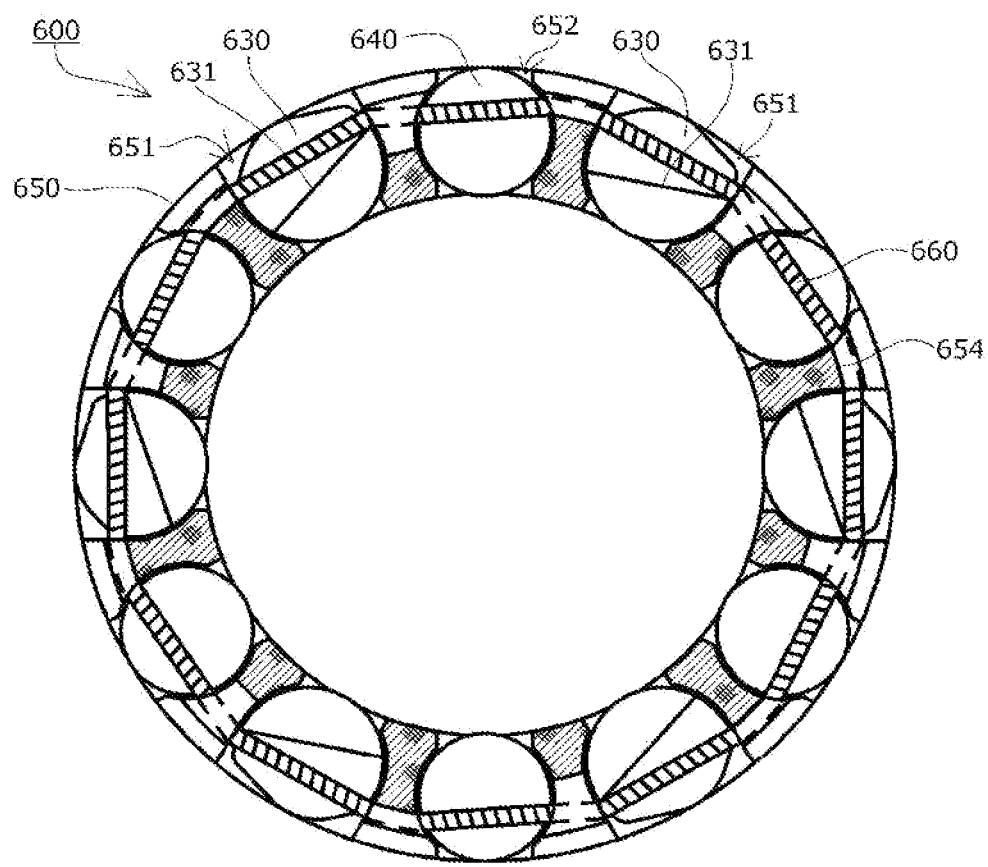
FIG. 14 is a side view of the cam clutch unit shown in FIG. 13 viewed in a rotation axis direction.
Figure 15:
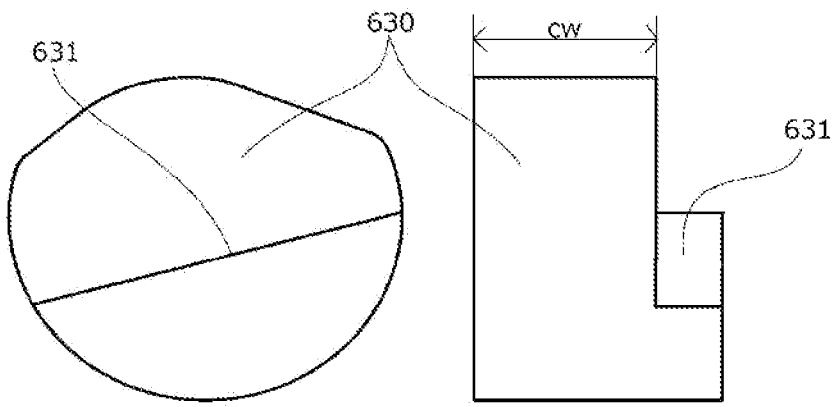
FIG. 15 is a side view and a front view of a cam of the cam clutch unit shown in FIG. 13.
Figure 16:
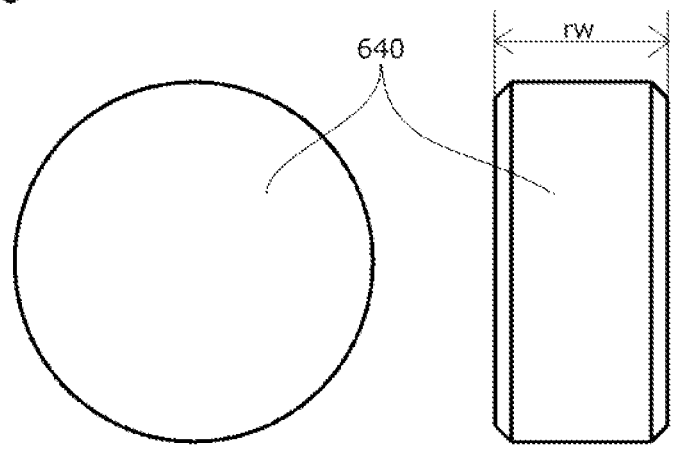
FIG. 16 is a side view and a front view of a roller of the cam clutch unit shown in FIG. 13.
Figure 17:
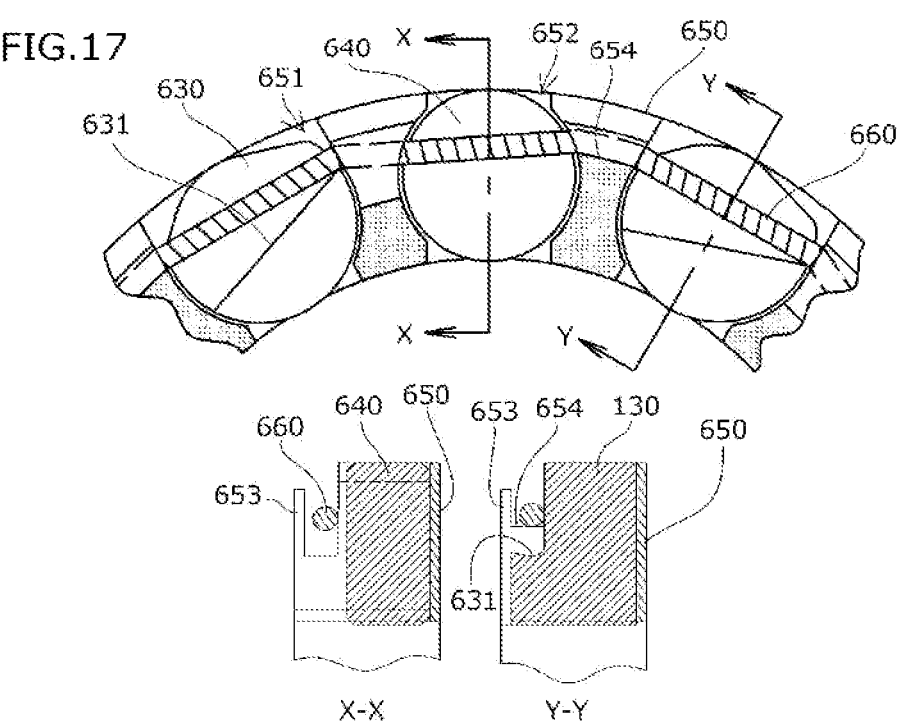
FIG. 17 is a partial side view and a sectional view of the cam clutch unit shown in FIG. 13.

The cam clutch unit according to another Embodiment of the present invention has, as shown in FIG. 7, a contact-stop portion 158 which regulates movement in the axial direction of the roller 140 to the spring 160 side on the pocket portion 152 accommodating the roller 140.

As a result, contact between the roller 140 and the spring 160 can be completely eliminated, and rotational resistance can be further reduced.

Moreover, the claw portion 157 provided on the surface adjacent to the roller 140 of the pocket portion 152 accommodating the roller 140 does not continue in the axial direction of the roller 140 but is provided by being divided into plural.

In this Embodiment, they are provided in the vicinity of both end parts in the axial direction of the roller 140, but the spots thereof, the number of divisions, and the length in the axial direction may be designed arbitrarily or may be different between the opposing surfaces.

The Embodiments of the present invention have been described in detail, but the present invention is not limited to the aforementioned Embodiments but are capable of various design changes without departing from the present invention described in the scope of claims.

For example, in the aforementioned Embodiments, the engagement stepped portion capable of engagement with the spring is provided on one of the end surfaces in the axial direction of the cam, but it may be so configured that the cam has the engagement stepped portion provided at the center as conventional, the spring is extended at the center part in the axial direction, and the plurality of rollers are inserted with the spring sandwiched into the pocket accommodating each of the rollers.

Moreover, it may be so configured that the engagement stepped portion is provided on both end surfaces in the axial direction of the cam, and the hook portion is provided on both sides in the axial direction of the cage ring and is urged by two annular springs.

What is claimed is:

1. A cam clutch unit comprising a plurality of cams and a plurality of rollers disposed between an inner ring and an outer ring coaxially provided capable of relative rotation, a cage ring having a plurality of pocket portions which regulate relative movement in a circumferential direction of the cams and the rollers, and an annular spring which urges the cams, wherein
   the cams have an engagement stepped portion capable of engagement with the spring;
   the cage ring has an end-part circumferential annular portion continuing in the circumferential direction on an end surface in the axial direction;
   a surface of one of the pocket portions adjacent to the corresponding roller in the circumferential direction is formed having a shape which regulates movement of the roller to the outer ring side and the inner ring side and has a claw portion capable of insertion of the roller from the outer ring side or the inner ring side by elastic deformation,
   wherein the cage ring has a plurality of hook portions which regulate movement of the annular spring in the axial direction, and
   the hook portion has a hook bottom portion which regulates the movement in a radial direction of the annular spring.

2. The cam clutch unit according to claim 1, wherein the claw portion has chamfering, which facilitates insertion, on an end part on an insertion side of the roller.

3. The cam clutch unit according to claim 1, wherein the pocket portion which accommodates the roller has a contact-stop portion which regulates movement in an axial direction of the roller to the spring side.

4. The cam clutch unit according to claim 1, wherein the claw portion includes a plurality of claw portions provided in plural in an axial direction with a length smaller than an axial length of the roller.

* * * * *